INVENTORS: P. A. BAKER
M.A. LOGAN
BY: J. P. Kearns
ATTORNEY

DATA RECEIVER SYNCHRONIZER FOR ADVANCING OR RETARDING PHASE OF OUTPUT AFTER SAMPLING OVER PERIOD OF TIME

Filed July 9, 1963 4 Sheets-Sheet 2

Sept. 28, 1965 P. A. BAKER ETAL 3,209,265

DATA RECEIVER SYNCHRONIZER FOR ADVANCING OR RETARDING PHASE OF OUTPUT AFTER SAMPLING OVER PERIOD OF TIME

Filed July 9, 1963 4 Sheets-Sheet 3

DATA RECEIVER SYNCHRONIZER FOR ADVANCING OR RETARDING PHASE OF OUTPUT AFTER SAMPLING OVER PERIOD OF TIME

Filed July 9, 1963

4 Sheets-Sheet 4

United States Patent Office 3,209,265
Patented Sept. 28, 1965

3,209,265

DATA RECEIVER SYNCHRONIZER FOR ADVANCING OR RETARDING PHASE OF OUTPUT AFTER SAMPLING OVER PERIOD OF TIME

Paul A. Baker, Middletown, and Mason A. Logan, Colts Neck, N.J., assignors to Bell Telephone Laboratories, Incorporated, New York, N.Y., a corporation of New York Filed July 9, 1963, Ser. No. 294,793
11 Claims. (Cl. 328—63)

This invention relates to synchronous data communications systems in general and more specifically to the recovery of a synchronizing signal at the receiver in such a system.

In a copending application of Paul A. Baker, Serial No. 49,544, filed on August 15, 1960, now Patent No. 3,128,343 granted April 7, 1964, a data communications system is disclosed in which binary on-off data signals are transmitted in bit pairs by a relative phase shift encoding of the transmitted carrier wave. Serial data are converted first into bit pairs, or dibits as Baker styles them, which are effective to shift the start or epoch angle of the transmitted carrier wave during each signal interval by an odd multiple of 45 degrees with respect to the epoch angle of the previous dibit. The relative phase of one dibit, with respect to the previous dibit, constitutes the intelligence transmitted. An important feature of this data communications system is that a minimum 45-degree phase shift is effected even in the case of repeated dibit pairs occurring in a message. No separate synchronizing signal need be transmitted, since there is a transition in the signal wave at the beginning of each dibit period regardless of message content.

The receiver in the Baker system uses a differentially coherent recovery method in which a current carrier phase and the next previous carrier phase derived from a one-dibit delay line are product modulated together to form resultant waves embodying the phase difference.

In order, however, to make the final determination of the state of the transmitted message, it is necessary that the receiver know the exact interval during which each dibit is present. Timing or synchronizing pulses must therefore be generated at the receiver to insure sampling at the proper instant for each dibit pair. Even though a phase transition is inherent in each dibit period in the relative phase transmission system, nevertheless degraded transmission lines introduce severe delay and amplitude distortion and noise which may impair the receiver's ability to distinguish a true transition in phase from a spurious one. Under these circumstances it appears preferable to employ a local clock oscillator whose transitions can be adjusted periodically to hold it in synchronism with transitions in the transmitted wave, yet be stiff enough not to respond to false transitions in the received wave.

It is, accordingly, an object of this invention to synchronize a local receiver clock with the transitions in a synchronous message wave over a long interval of time.

It is a further object of this invention to synchronize a local receiver clock according to the time average of the transitions in a synchronous message wave.

It is another object of this invention to distinguish between true wave transitions inherent in the message wave and false wave transitions due to transmission line disturbances and respond only to the true transitions in adjusting the phase of a local receiver clock.

It is still another object of this invention to shorten the time interval over which received transitions are found to occur outside the expected true transition interval and also to sound an alarm in such event.

According to this invention, a local receiver clock is comprised of a stable oscillator at many times the frequency of the transitions in a received message wave and a frequency-dividing countdown chain driven by the oscillator. A pair of counting circuits, alternately gated by the nominal synchronizing wave generated in the countdown chain, count true message wave transitions occurring both before and after the nominal transition time established by the local clock. If, over a period of time, message wave transitions occur preponderantly before or after the nominal transition time, a correction signal is injected into the countdown chain to advance or retard the phase of the countdown circuit output accordingly. If message wave transitions occur with equal frequency both before and after the nominal transition, no correction is made. Thus, corrections are not made for each and every message wave transition, but rather these transitions are averaged over a considerable period of time before making a correction. A more stable receiver clock signal results.

In addition, the message wave transitions being counted by the averaging circuits are monitored to insure that at least some of those being counted occur within a range about the nominal transition. The monitor circuit includes a timer which times out when the transitions being counted are not within the nominal transition range and an anti-lock signal is then generated. This anti-lock signal is generated when synchronism is completely lost to reduce the time over which transitions are averaged by the counting circuits in an effort to pull the local clock back into synchronism as rapidly as possible.

It is a feature of this invention that apparatus for carrying out the objects of this invention can be constructed from standard logic components, such as, binary counters, flip flops, and AND and OR gates.

It is another feature of this invention that synchronization with the time average of received data transitions largely eliminates jitter from the resultant corrected wave and also prevents false synchronization with noise impulses.

The objects, features and advantages of this invention will be more readily appreciated from a consideration of the following detailed description and the drawing in which.

Figure 1:
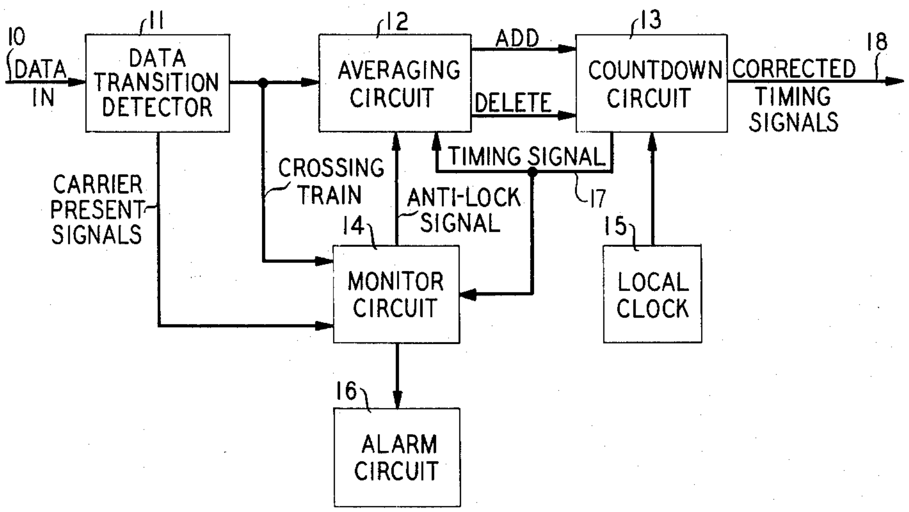
FIG. 1 is a block diagram showing the basic plan of operation for the timing recovery system of this invention.

The principle of this invention is illustrated in FIG. 1. Incoming synchronous data appears on line 10, having the characteristics described in the cited Baker patent, and is applied to data transition detector 11. This can conveniently comprise the system of delay line and product demodulators described in the Baker application. Each data transition is made to generate a pulse of common polarity on the output line, corresponding to the beginning and end of each demodulated serial bit. Because the bits are finally sampled in a threshold circuit, the transitions are not necessarily in exact phase with the transmitted clock. These axis-crossing pulses appear on an output line as a train of positive pulses. Detector 11 is also equipped to deliver a carrier-present signal on another output line.

The receiver is further provided with a stable local clock 15 which can be crystal controlled and accurately matched in frequency with the basic transmitter clock. The output of this clock is a square wave at many times the frequency of the data transitions. In a practical embodiment the frequency of this clock is set at 32 times the serial transmission rate or 64 times the transition rate (dibit rate). The output of this clock is then divided down to the data transition rate in a countdown circuit 13, which can advantageously comprise a plurality of binary counter stages.

One output on line 17 is fed back to an averaging circuit 12. This circuit includes two counting chains, each of which is resettable. One counting chain counts axis-crossing pulses occurring before the nominal transition as determined by countdown circuit 13, and the other counting chain counts axis-crossing pulses occurring after the nominal transition. Arrangement is further made for each axis-crossing pulse to reset the other counter so that only axis-crossings occurring repeatedly before or after the nominal transition generate a correcting output. Randomly occurring axis crossings alternately before and after the nominal transition produce no correction. A maximum count is established for each counter, say 15 for a four-stage binary counter, so that a correction is not applied more often than this minimum number of transitions. Depending on which counter achieves its full count an add or delete correction pulse is generated. The delete pulse blocks one cycle of the local clock output and therefore retards the phase of the output of countdown circuit 13 by a small fraction of the output timing signal period. On the other hand, the add pulse is applied to an intermediate stage of the countdown circuit to reset it prematurely, thus effectively advancing the phase of the output timing signal. The timing signals appearing on output lead 18 for application to the data recovery equipment are maintained in phase with the time average of the zero-crossings in the data wave. Since the corrections are applied only at relatively long intervals and the actual correction is moderate in amount, there is a much greater jitter reduction than in a system which applies a correction for every axis crossing deviation.

A special feature of the invention is monitor circuit 14. This circuit also receives the axis crossing train from detector 11 and the timing signal from countdown circuit 13. From the timing signal it generates a pulse train which brackets the time interval in which axis-crossing pulses are validly received. It also includes a timing circuit. As long as the axis crossings occur within the prescribed time interval the timing circuit is held inoperative. If an axis-crossing pulse is missed, the timing circuit begins to time out. Any subsequent axis crossings reset the timer. On running out, however, the timing circuit generates an anti-lock signal which is applied to the averaging circuit to prevent alternate axis crossings from resetting the averaging counters. Thus, the counters are allowed to reach their full counts more rapidly than usual and start generating correction signals.

Monitor circuit 14 further includes means for generating a pulse train 180° out of phase with the true-crossing interval. If axis-crossing pulses occur within this period, alarm circuit 16 is operated as an indication that false crossings are being received. These false crossings may be due to noise impulses on the transmission line or to complete lack of synchronism of the receiver timing signal. If no anti-lock signal is generated at the same time that the alarm occurs, the former situation is highly probable. If, on the other hand, the anti-lock signal is generated along with the alarm signal, it is good indication that the latter situation is present.

Monitor circuit 14 also receives the carrier-present signal from detector 11. When this signal disappears, no anti-lock signal can be generated. The timing circuit remains on to prevent clock corrections due to noise alone at a time when the line level is below the level necessary to operate the carrier-present circuit, but high enough to operate the demodulators and axis crossing detector.

Figure 2:
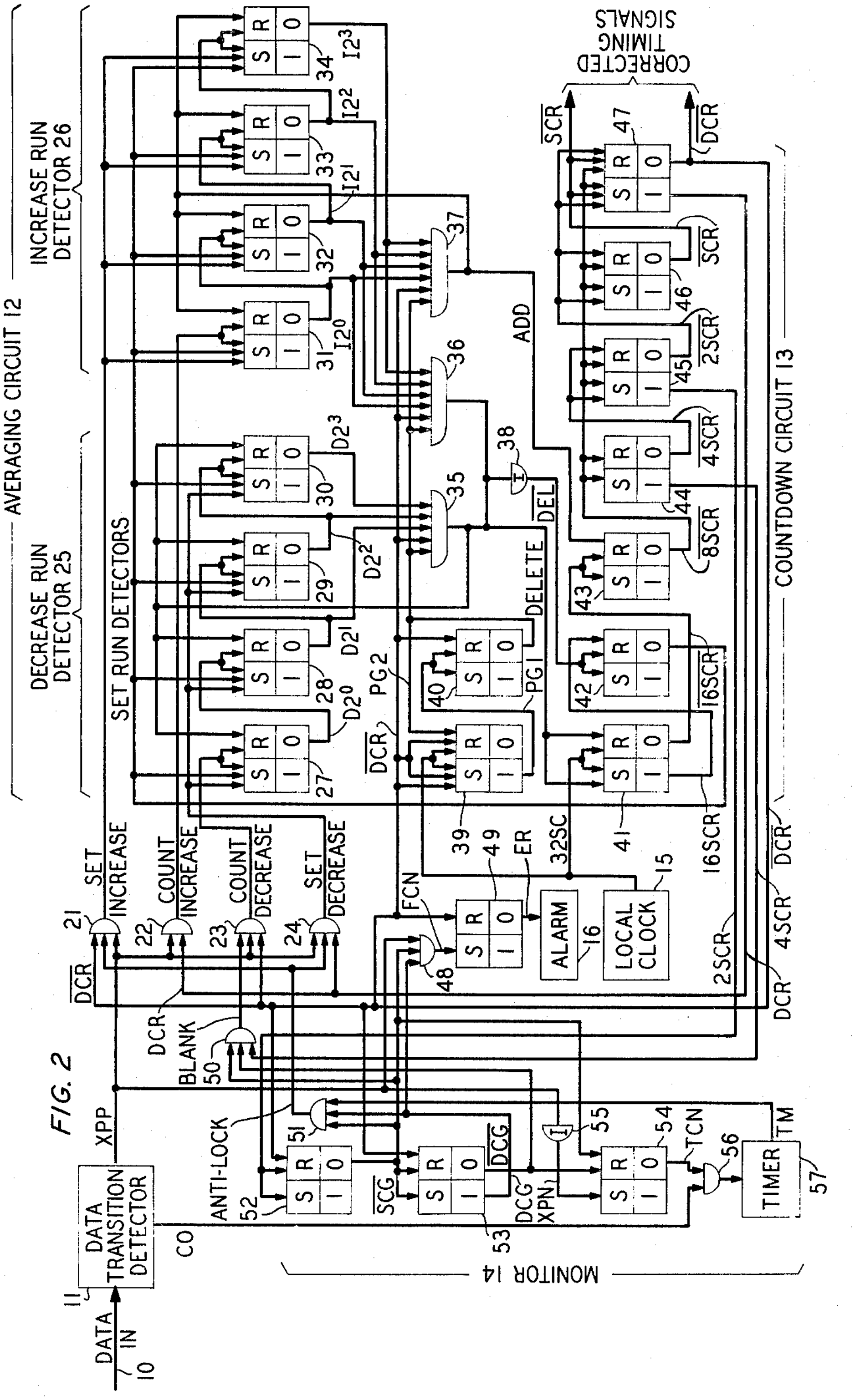
FIG. 2 is a more detailed block schematic diagram of an embodiment of this invention.

FIG. 2 is a block schematic diagram of a practical embodiment of this invention using standard logic components.

A plurality of binary counters is shown. These are represented by a four-compartment square with the compartments designated S (set), R (reset), 1 and 0. S and R compartments represent inputs and 1 and 0, outputs. Each counter is a bistable circuit. An input at S produces a "1" output. An input at R produces a "0" output. Simultaneous inputs at S and R reverse the output states from their previous condition and are therefore complementing or counting inputs. All inputs are isolated from each other by diodes in a conventional manner. The active elements within the counters can be transistors or electron tubes in any well known arrangement.

A flip-flop is also used, such as block 49. This is essentially the same as a binary counter, except that no complementing input is provided. The output state, once set, holds indefinitely until the other input is pulsed.

Coincidence or AND-gates, represented by an arc of a circle and a chord connecting the ends of the arc, provide an output only when all inputs are pulsed positively simultaneously and no output, otherwise.

An inverter, also represented by an arc and a chord, is essentially a one-input OR-gate. Both the AND-gate and the inverter cause inversion of the output. The convention assumed here is that a ground represents a "1" or marking signal, and a positive voltage represents a "0" or spacing signal. In any of the counters and flip-flops, the ground state is pre-emptive. Only a negative-going pulse can cause a change of state. Signals and their complements are designated by letters and numerals alone and by the same letters and numerals with an overscore.

As in FIG. 1, the main elements of the timing recovery system of FIG. 2 comprise an averaging circuit 12, a countdown chain 13 and a monitor circuit 14. A statistical decision method, based on an analysis of runs of received wave axis crossings occurring ahead of and behind the nominal transition time, is employed to control the rate and determine the sense of small phase corrections made in the output of a local clock. The negative transitions of the local clock divided down to the dibit rate represent the time average of the demodulated data zero-axis crossing pulse distribution. The randomly occurring axis-crossing pulses, having the periodicity of the received signal dibit repetition rate, have an equal probability of occurring before or slightly after the negative transition of the local dibit clock wave.

Axis-crossing pulses which occur before the negative transition of the dibit clock wave are gated to a chain of tandem binary counters, called run detectors, and cause the chain to count while simultaneously setting a second chain of tandem binary counters to an initial reference condition. The situation is reversed for axis-crossing pulses occurring after the negative transition of the dibit clock wave. If a full count is achieved in either the increase or decrease run detector an "add" or "delete" correction pulse is generated which shortens or lengthens one cycle of the dibit clock wave by 1/64 of its period.

In a practical system the local clock frequency and the axis crossing repetition rate will inevitably differ to some extent. As time goes on the phase difference between the two signals will increase. The probability that a correction in the local clock will be made when the run detector receiving the preponderance of gated axis-crossing pulses finally achieves a full count is then increased.

The complete local clock comprises a local clock oscillator 15 and a countdown circuit 13. Local clock oscillator 15 can advantageously be a crystal-controlled stable oscillator with a square wave output at 64 times the dibit repetition rate. For this system the actual dibit rate is 1275 per second and the serial rate is 2550 per second. Therefore, the oscillator frequency is 81.6 kilocycles per second.

Since 64 is 2 raised to the sixth power, six binary counter stages are required to count down to the dibit rate. Accordingly, countdown circuit 13 comprises the six binary counters 41 and 43 through 47. The output of oscillator 15, designated 32SC, is applied to the complementing or counting input of binary counter 41. The "0" output of counter 41 is applied to the counting input of binary counter 43. The remaining counters 44 through 47 are similarly connected in tandem, "0" output to counting input. There would normally be a significant propagation time delay between the negative transitions in the oscillator wave and the dibit wave except for the fast-carry connection between the $\overline{8SCR}$ output of counter 43 and the remaining counters 44 through 47 as shown in FIG. 2. The separate interstage counting inputs in these stages, however, prevent the carry except when the preceding stage is also changing state. There is a further fast-carry connection from the "0" output of counter 45 to the count input of counter 47 to keep these two counters precisely in phase.

Counter 42 is outside the countdown chain and its purpose will be described below.

The "0" output of final counter 47 is the dibit timing square wave which is to be brought into synchronism with the axis crossings in the received data wave. Referring to the waveform diagram of FIG. 3, we show on the first seven lines the normal relationships among the "1" outputs of each of counters 41 and 43 through 47. They are all square waves and all go initially positive together. Each successive square wave is at half the frequency of the preceding one. They are designated 32SC (serial clock), 16SCR (serial clock receive), 8SCR, 4SCR, 2SCR, SCR and DCR (dibit clock receive), according to their relation to the SCR wave. Any of these waves can be used as necessary in the receiver system.

The received data wave appears on line 10 of FIG. 2 and all zero axis crossings are detected and a pulse for each crossing is generated on output line XPP (crossing pulse positive). Detector 11 produces an additional output on the CO (carrier-on) lead which is used in the monitor circuit, as explained later. The XPP pulse train is depicted on line 13 of FIG. 3 as a generally random grouping of pulses about the nominal dibit timing wave negative crossing. These pulses are obtained from the outputs of the A and B registers shown in the cited Baker patent. The A portion of a dibit is the first bit occurring during the positive half of the dibit timing wave and the B portion is the second bit occurring during the negative half of the dibit timing wave. Since the A and B registers make their own decision on the exact time that a crossing occurs, the XPP pulses are randomly spread and can overlap. Lines 11 and 12 of FIG. 3 indicate typical outputs of the B and A registers described in the Baker patent. From these random pulses timing is to be derived in the receiver.

The XPP train is applied in common as inputs to coincidence or AND-gates 21 through 24. The complementary DCR and $\overline{DCR}$ outputs of the countdown circuit alternately enable gates 22 and 24 as one pair and gates 21 and 23 as another pair. The BLANK input to gate 23 and the ANTI-LOCK inputs to gates 21 and 24 can be considered as enabling at this time. The outputs of gates 21 through 24 control the run detectors of averaging circuit 12. There are two run detectors, each comprising a four-stage tandem binary countdown chain. These are designated decrease run detector 25 and increase run detector 26. Decrease run detector 25 includes counter stages 27 through 30, the "0" output of each connected to the count input of the next. The count input of counter 27 is driven by the output of gate 23, which causes a change in output state for each XPP pulse occurring during the negative half-cycle of the dibit wave DCR (positive half-cycle of $\overline{DCR}$). There is a set line running from the output of gate 24 to the set input of each of counter stages 27 through 30. The "0" outputs of the respective decrease counters are designated $D2^0$, $D2^1$, $D2^2$ and $D2^3$.

Increase run detector 26 likewise includes counter stages 31 through 34 which are tandem connected. The count input of counter 31 is driven by the output of gate 22, which causes a change in output state for each XPP pulse occurring during the positive half-cycle of dibit wave DCR. There is similarly a set line running from the output of gate 21 to the set input of each of counter stages 31 through 34. The "0" outputs of the respective increase counters are designated $I2^0$, $I2^1$, $I2^2$ and $I2^3$.

The initial state of both run detectors is defined by a ground on each "1" output. For each count input the "0" outputs advance by one count and store it. However, each count input to one detector is accompanied by a set input to the other counter. As a result neither counter reaches a full count unless the XPP pulses consistently fall on one particular side of the dibit wave negative transition. Randomly occurring XPP pulses on both sides of the transition leave the countdown chain uncorrected on the basis that the receiver dibit wave is in phase on the average.

In order to further reduce the occurrence of full counts in the increase counter and hence the number of clock corrections, a blank pulse is generated immediately following the negative transition of the DCR wave and applied to gate 23. The blank pulse is formed in binary counters 52 and 53 in monitor circuit 14. Counters 52 and 53 are connected in tandem, "0" output of counter 52 to count input of counter 53. The count input of counter 52 follows the 2SCR output of counter 45 in countdown circuit 13 and hence the output SCG (serial clock gate) is 90° out of phase with SCR, and the output DCG is 45° out of phase with the dibit wave DCR. The SCG and DCG waves are shown on lines 8 and 9 of FIG. 3. The $\overline{DCG}$ and $\overline{SCG}$ waves are applied to AND-gate 50 together with the 4SCR output of counter 44 in countdown circuit 13. The result is a blanking wave on the input of gate 23 equivalent to two cycles of the 4SCR wave symmetrical about the negative transition of the DCR wave. The blanking wave is shown on line 10 of FIG. 3. Only the negative half-cycle immediately following the negative transition of the DCR wave is effective since gate 23 is gated off by the $\overline{DCR}$ wave until after the negative DCR transition. This arrangement not only blanks XPP pulses occurring immediately after the DCR negative transition but prevents an XPP pulse which straddles the DCR transition from being counted twice—once by each run detector or counter.

Figure 3:
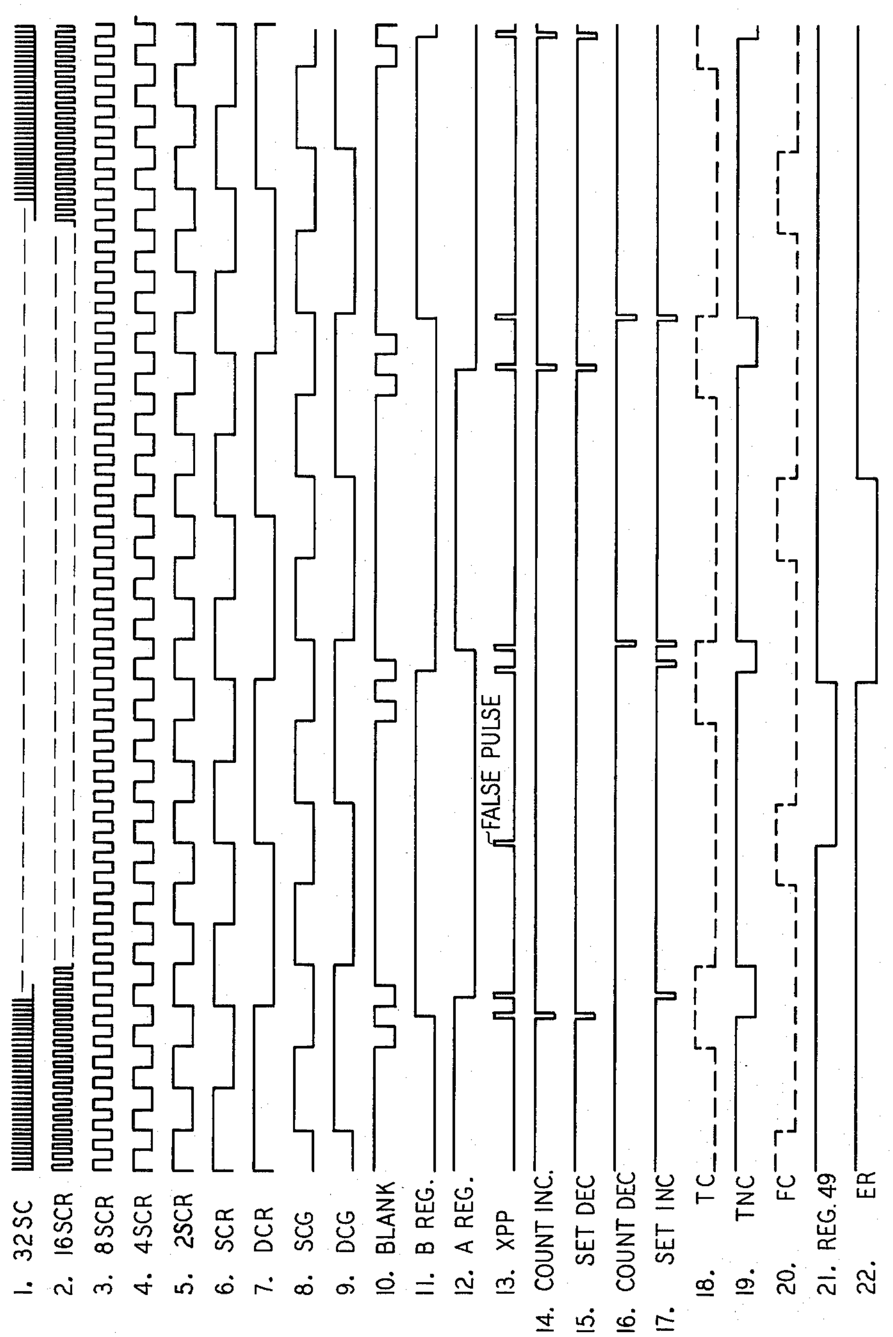
FIGS. 3 and 4 are waveform diagrams showing in idealized form waveforms appearing in different parts of the embodiment of FIG. 2, which are helpful in gaining an understanding of the operation of this invention.

The manner in which output pulses are produced in gates 21 through 24 can now be considered. As is explained in the cited Baker patent, serial data is recovered at the receiver in an A and a B register, which are set and reset each dibit period in accordance with the nature of the serial data bits originally encoded at the transmitter. Lines 11 and 12 of FIG. 3 depict typical waveforms obtained in the outputs of these registers. It is seen that there are axis-crossing transitions in each wave approximately located in time near the negative transitions of the DCR wave. These transitions are not coincident because of the decision nature of the detection circuit which determines just when an axis crossing occurs. From these transitions at the registers a crossing pulse train XPP, shown on line 13 of FIG. 3, is generated with the aid of a monopulser or one-shot multivibrator in detector 11. The XPP pulses are applied to all of gates 21 through 24 in common. However, the gates are alternately enabled in pairs by the DCR and $\overline{DCR}$ waves, as shown in FIG. 2. Gates 21 and 23 are enabled together by the $\overline{DCR}$ wave following the negative transition of the DCR wave. The blanking pulse is also effective on gate 23 for a brief interval at this time. The output of gate 21, now formed when an XPP pulse occurs during this interval, sets increase run detector 26 at this time to its initial state as indicated on line 17 of FIG. 3. At the same time because of the blanking pulse no count decrease pulse occurs as indicated on line 16 of FIG. 3. An XPP pulse occurring during the $\overline{DCR}$ positive half-cycle and following the blanking pulse does register a count in the decrease run detector, as happens with the fifth XPP pulse on line 13 of FIG. 3. During the positive half-cycle of the DCR wave gates 22 and 24 are enabled and all XPP pulses occurring before the negative transition of the DCR wave are gated to register a count in increase run detector 26 and at the same time to set decrease run detector 25 to its reference state. Lines 14 and 15 of FIG. 3 show the outputs of gates 22 and 24 as just described. With the simultaneous setting of the opposite run detector with each count pulse it is readily apparent that it is a relatively infrequent occurrence for either run detector to achieve a full count and generate a correction pulse. Only when the local clock drifts by a considerable amount will correction pulses begin to occur.

The correction pulses which do occur when a full count is finally reached in either run detector are formed in AND-gates 35, 36 and 37. AND-gate 35 forms a "delete" correction pulse when 14 counts accumulate in decrease run detector 25 because the outputs $D2^1$, $D2^2$ and $D2^3$ of the detector all reach the ground state on the fourteenth count from the reference state. Only these three counter outputs are applied to gate 35. Similarly, an "add" correction pulse is formed when increase run detector 26 reaches the count of 15 after the initial state because all four outputs $I2^0$, $I2^1$, $I2^2$ and $I2^3$ are connected to gates 36 and 37. The outputs of gates 36 and 37 occur together, the output of gate 37 being the "add" pulse proper and the output of gate 36 being connected to the "delete" pulse line.

A full count in the decrease run detector is set at 14, while that in the increase run detector is set at 15 in order to compensate for the slightly favoring bias given the increase run detector by the presence of the blanking pulse.

There are two additional inputs to gates 35 through 37: namely, the $\overline{DCR}$ wave and the PG2 output of counter 40. Counters 39 and 40 form a sampling pulse for gates 35 through 37 just after the DCR wave goes positive. Counter 39 receives a count input directly from the output of the local oscillator 15. However, the $\overline{DCR}$ wave is also connected to a count input as well as to the set input and effectively inhibits the other count input until the $\overline{DCR}$ wave goes positive. Counter 39 then counts on the next negative transition of the 32SC wave. Its "1" output, PG1, connected to the count input of counter 40, allows one count on this counter. Its "0" transition $\overline{PG2}$ holds counter 39 in the reset condition. Both the $\overline{DCR}$ wave and the PG2 output are applied to all three AND-gates 35 through 37 to form an effective sample pulse equal in width to one cycle of the 32SC wave or $\frac{1}{32}$ of a dibit period. These waves are illustrated on lines 4 through 7 of FIG. 4. The sample wave on line 7 is dotted because it is a composite of the $\overline{DCR}$ and PG2 waves and cannot be separately observed on a test instrument. It is, however, the effective resultant of the two inputs to gates 35 through 37.

The outputs of gates 35 and 37 feed back to the reset inputs of the respective run detectors to hold them in the full count condition until the sample pulse is generated.

Figure 4:
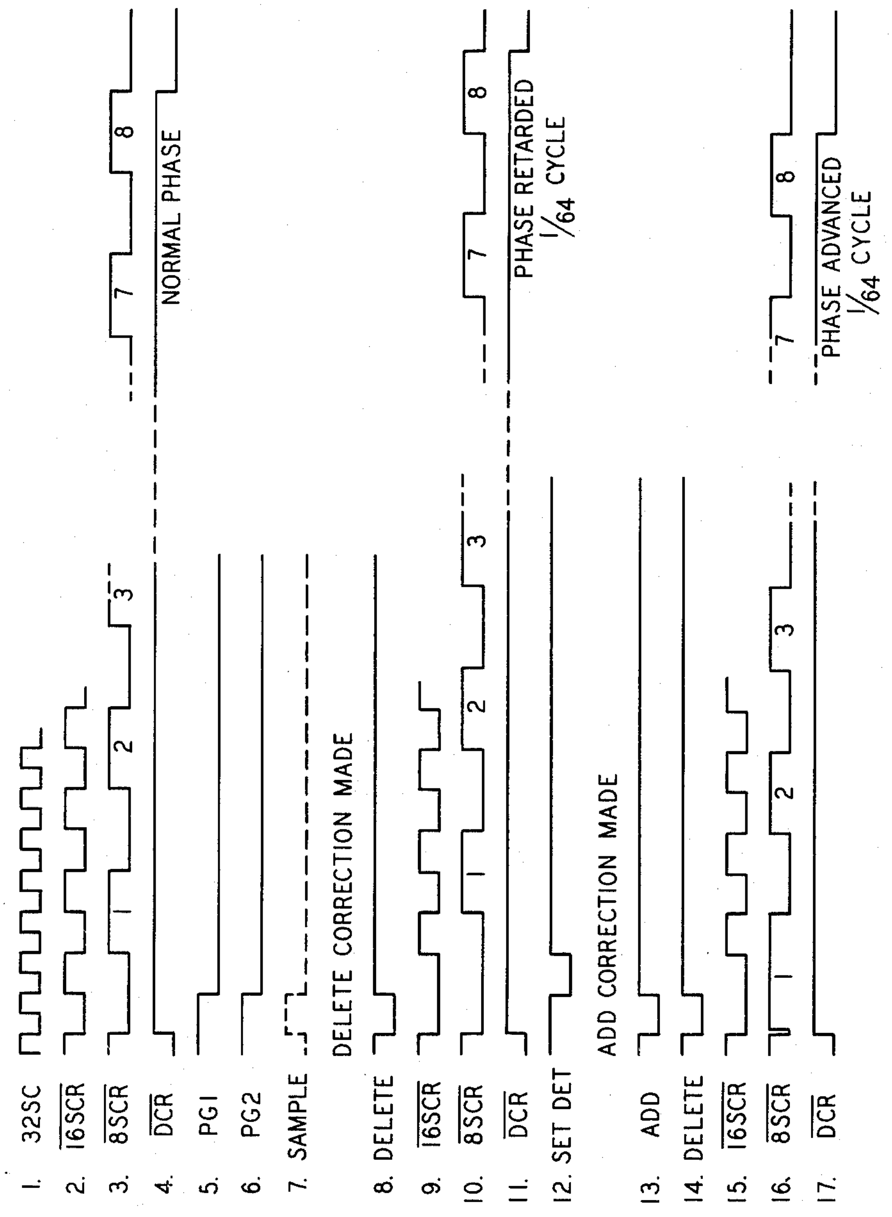

An output on either of gates 35 or 36 during the sample pulse inhibits the count input of counter 41 in the countdown circuit 13 as shown in FIG. 4. Line 1 of FIG. 4 shows the 32SC output of oscillator 15. Similarly, line 2 shows the uncorrected $\overline{16SCR}$ output of counter 41. The delete pulse on line 8 inhibits the count input of counter 41 for one cycle of the 32SC wave and the $\overline{16SCR}$ wave, as shown on line 9, is retarded by a half cycle. As this retardation propagates through the countdown circuit the dibit wave $\overline{DCR}$ is retarded by $\frac{1}{64}$ cycle, as indicated on line 11. This $\overline{DCR}$ wave can be compared with the uncorrected $\overline{DCR}$ wave on line 4. The effect on the $\overline{8SCR}$ output of counter 43 is shown on line 10, where the retardation is one-quarter cycle.

It will be noted that the "delete" pulse is reversed in polarity in inverter 38 as $\overline{DEL}$ on FIG. 3 and causes a count in counter 42, whose output is reset after the 16SCR wave goes negative. The "0" output of counter 42 is called the "set run detectors" output. This pulse one cycle of 32SC in duration, is applied to all set inputs of the run detectors 25 and 26 and returns both of them to their initial reference condition.

The "add" pulse output of gate 37 is applied to a reset input of counter 43 and causes its $\overline{8SCR}$ output to return to the positive state immediately after it is made negative by the $\overline{16SCR}$ wave negative transition. There is just sufficient inherent propagation delay between the output of oscillator 15 and counter 43 so that the "add" pulse follows the 32SC and $\overline{16SCR}$ transitions. This action advances the phase of the $\overline{DCR}$ wave by $\frac{1}{32}$ cycle. However, the "add" pulse is always accompanied by a "delete" pulse from gate 36, so that the advance in phase at counter 43 is partly cancelled by the retardation in phase at counter 41. The net change in the $\overline{DCR}$ wave is an advance of $\frac{1}{64}$ of a cycle in phase. These effects are clearly shown in the waveforms of lines 13 through 17 of FIG. 4. The phase advance in the $\overline{DCR}$ wave on line 17 can be compared to the normal uncorrected phase on line 4 and the retarded phase on line 11.

Monitor circuit 14 has also been receiving the axis-crossing pulse train XPP. Flip-flop 54 is controlled by the outputs of counters 52 and 53 which generate the SCG and DCG gating waves and is regularly clamped in the reset state by them except for an eighth-cycle preceding and following the negative transition of the DCR wave. This quarter-cycle of the DCR wave symmetrical about this negative transition is defined as the true-crossing interval, and is indicated on line 18 of FIG. 3 by the dashed wave. The inverted XPP wave XPN from inverter 55 is applied to the set input of flip-flop 54 to produce the output TCN (true crossing negative), as shown on line 19 of FIG. 3. The TCN pulse is terminated when the DCG wave next changes state at the end of the true-crossing interval. A train of TCN pulses is formed if crossing pulses continue to occur in every true-crossing interval. This train of pulses through buffer gate 56 holds timer 57 in an off-state. This timer generates an output TM if the TCN pulses fail for a predetermined time interval. On its occurrence output TM enables AND-gate 51, which produces an anti-lock output train during every other negative half-cycles of the SCG wave, coincident with the false-crossing interval. The anti-lock output inhibits gates 21 and 24 and prevents the setting of either run detector in averaging circuit 12. Thus, these run detectors operate as ordinary binary counters and correction pulses are generated as soon as either counter arrives at a full count, regardless of the state of the other counter. As soon as an axis crossing occurs within the true crossing interval, timer 57 is reset and the anti-lock train ceases.

Timer 57 is also controlled by the carrier-on signal CO through AND-gate 56. Thus, if no carrier signal is being received, the anti-lock signal cannot be generated. Otherwise, the system would attempt to synchronize itself on noise pulses.

In another flip-flop 49 the false crossing interval is defined as a quarter cycle symmetrical about the positive transition of the DCR wave. This flip-flop is clamped in the set condition by the SCG and DCG waves except during the false crossing interval by AND-gate 48. The XPP pulse train is also applied to this gate to form a pulse FCN for any random pulse within this interval such as that indicated near the center of line 13 of FIG. 3. This XPN pulse sets the flip-flop, which is reset on the next negative transition of the DCR wave. On this resetting the output ER of fixed and known duration is produced to operate alarm 16. Output ER can be applied to a counter, if desired, to establish an error rate for the system.

While the principles of this invention have been described in terms of a particular illustrative embodiment, it will be apparent to those skilled in the art that this averaging synchronization recovery system has wide application throughout the pulse and data transmission art. Its application is, of course, not restricted to use in phase modulation systems. This invention can be used with any synchronous system in which axis crossings can be obtained from a synchronous message wave.

What is claimed is:

1. A circuit for synchronizing a receiver local oscillator to a binary data wave having transitions between individual data bits occurring at a synchronous rate comprising means for generating a train of pulses corresponding to the wave transitions in said data wave, an increase binary counter having counting and set inputs, a decrease binary counter having counting and set inputs, a local clock source including a fixed frequency oscillator driving a plurality of frequency-dividing stages, the output of the last stage being a square wave at the nominal synchronous rate, a pair of gating means alternately enabled by the last stage output of said clock source, means connecting said wave-transition train of pulses to both said gating means, an output from one of said gating means causing said increase counter to count and said decrease counter be set to a reference condition, an output from the other of said gating means causing said decrease counter to count and said increase counter to be set to a reference condition, means responsive to a full count in said decrease counter for blocking one of the frequency-dividing stages of said clock source for a fraction of a period of the output wave thereby retarding the phase of the clock output square wave, and means responsive to a full count in said increase counter for adding a pulse to one of the frequency-dividing stages of said clock source for a fraction of a period of the output wave thereby advancing the phase of the clock output square wave.

2. A synchronizing circuit as defined in claim 1 and means for insuring that a data wave transition pulse straddling the instant at which the clock square wave reverses its phase is counted by one only of the binary counters comprising means for blanking one of said pair of gating means during a brief interval just after it is enabled by the clock square wave.

3. A synchronizing circuit as defined in claim 1 and a monitor circuit comprising means generating a gating signal bracketing one of the phase reversals in the clock square wave in which data wave transitions validly occur, a time-out circuit, means under the joint control of said gating signal and said train of data wave transition pulses for holding said time-out circuit inoperative, said time-out circuit running out and generating an output when said holding means receives no data wave transitions during the presence of said gating signal for a predetermined time interval, and means responsive to an output from said time-out circuit preventing the setting of said increase and decrease counters to the reference condition.

4. A synchronizing circuit as defined in claim 3 in which said monitor circuit also comprises means generating a further gating signal bracketing the other phase reversal in the clock square wave in which data wave transitions do not validly occur, an alarm circuit, means under the joint control of said further gating signal and said data wave transition pulses operating said alarm circuit as an indication that synchronism has been lost.

5. Apparatus for synchronizing a receiver oscillator with the time average of the transitions in a message wave comprising detector means for deriving a train of transition pulses from the received message wave, a local oscillator at many times the average frequency at which transitions occur in the message wave a frequency-dividing countdown circuit driven by said local oscillator and having an output at the nominal transition frequency, an averaging circuit including separate counting means for message wave transitions occurring before and after a transition in the output of said countdown circuit, means under the control of the output of said countdown circuit alternately gating inputs to said averaging circuit to the respective separate counting means, means connecting said train of transition pulses to said gating means, means for obtaining outputs from either of said separate counting means in said averaging circuit when a predetermined count is reached, and means for applying the outputs of said obtaining means to said countdown circuit, one said output advancing the phase of the output of said countdown circuit by a predetermined angle and the other said output retarding the phase of the output of said countdown circuit by a like predetermined angle.

6. An arrangement for synchronizing a local receiver clock with the transitions in a synchronous message wave comprising means detecting the transitions in said message wave, a local oscillator having a frequency many times said synchronous rate, a frequency-dividing countdown chain driven by said local oscillator and having a timing wave output nominally at said synchronous rate, an averaging circuit including an increase and decrease counting chain, gating means alternately enabled by the output of said countdown chain connecting said detecting means to the respective counting chains in said averaging circuit, message wave transitions about a particular transition in the timing wave output thereby registering a count in the increase counter or decrease counter according to whether it precedes or follows the particular transition and at the safe time setting the opposite counter to a reference condition, means responsive to a predetermined count in the increase counter producing an add signal, means responsive to a predetermined count in the decrease counter producing a delete output, means applying said add output to a stage of said countdown chain thereby advancing the phase of the timing wave output, and means applying said delete output to said countdown chain to block at least a cycle of the oscillator wave therefrom thereby retarding the phase of the timing wave output.

7. In combination, a source of data message waves having a synchronous transmission rate, means for generating a train of zero-axis-crossing pulses from said synchronous message waves, a stable local oscillator operating at an even multiple of said synchronous rate, a frequency-dividing countdown chain driven by said local oscillator, the output of said countdown chain being nominally at said synchronous rate, an increase run counter for zero-axis message-wave crossings preceding a transition in the output of said countdown circuit, a decrease run counter for zero-axis message-wave crossings following a transition in the output of said countdown chain, gating means controlled by the output of said countdown chain alternately directing said train of zero-axis crossing pulses to said increase and decrease run counters, means for setting each of said run counters to a reference condition for each zero-crossing pulse counted by the other counter, means responsive to a predetermined full count in said decrease run counter for blocking at least one cycle of the local oscillator wave from said countdown chain thereby retarding the phase of the output of said countdown chain by a predetermined phase angle, means responsive to a predetermined full count in said increase run counter for blocking at least one cycle of the local oscillator wave from said countdown chain and for prematurely resetting a stage of said countdown chain thereby advancing the phase of the output of said countdown chain by a predetermined phase angle, means blanking said decrease run counter for a brief interval after the transition in the output of said countdown chain to prevent an axis-crossing pulse overlapping said transition from being counted by both run counters, and means monitoring said axis-crossing pulses during a time interval bracketing the transition in the output of said countdown chain for disabling said setting means for said run counters when no axis-crossing pulses occur for an extended period within said bracketing time interval.

8. The combination of claim 7 in which said run counters comprise a plurality of binary counting stages connected in tandem and both said blocking means comprise coincidence gates having as inputs the outputs of the binary counting circuits of the associated run counter.

9. The combination of claim 7 in which said countdown chain comprises a plurality of binary counting stages connected in tandem so that each successive circuit halves the frequency of the output of the next preceding such circuit and includes a fast-carry connection extending over the inputs to two or more of these stages.

10. The combination of claim 7 in which said blanking means comprises two tandem binary counting stages, an input for the first of said counting stages connected to said countdown chain at a point at which the frequency is four times said synchronous rate, an output for the last of said stages which delivers a wave at said synchronous rate but in quadrature with the output of said countdown chain, a coincidence gate enabled by said binary counting stages during a transition in the output of said countdown chain, an output connection from said gate to said decrease run counter for inhibiting the input thereto for a brief interval, following the transition in the output of said countdown chain, and means for applying one cycle of a wave at eight times the frequency of said synchronous rate to said coincidence gate from said countdown chain as a blanking signal.

11. The combination of claim 7 in which said monitoring means comprises a bistable circuit having set and reset inputs and an output, means connected to the reset input of said bistable circuit for establishing a true-crossing time interval bracketing the transition in the output of said countdown circuit during which valid axis-crossing pulses should occur, said establishing means clamping said bistable circuit in the reset condition except during said true-crossing interval, means applying said train of crossing pulses to the set input of said bistable circuit, a time-out circuit producing an anti-lock output after a predetermined time interval and connected to the output of said bistable circuit, said time-out circuit being blocked from timing out as long as crossing pulses occur within said true-crossing interval, and means connecting said anti-lock output to said setting means to block the operation thereof for the duration of said anti-lock output.

References Cited by the Examiner

UNITED STATES PATENTS

| | | | |
|---|---|---|---|
| 3,028,552 | 4/62 | Hahs | 328—63 X |
| 3,029,389 | 4/62 | Morphet | 328—63 X |
| 3,142,802 | 7/64 | Maure | 328—63 X |

ARTHUR GAUSS, *Primary Examiner.*